United States Patent Office 3,145,143
Patented Aug. 18, 1964

1

3,145,143
PREPARING OXYGENATED HIGH TITER VIRUS CULTURES IN NUTRIENT-FREE PHYSIOLOGICALLY BALANCED SALT SOLUTION

David Taylor-Robinson, % Harvard Hospital, Coombe Road, John Craig Nicholson Westwood, 73 St. Francis Road, and Harold Thomas Zwartouw, 15 Montague Road, all of Salisbury, Wiltshire, England No Drawing. Filed Aug. 19, 1960, Ser. No. 50,591
Claims priority, application Great Britain Feb. 29, 1960
3 Claims. (Cl. 167—78)

The present invention relates to virus culture and is concerned with the cultivation of viruses in animal tissue cells.

The provision of virus suspensions of adequate concentration and purity for use in the preparations of vaccines, diagnostic antigens and for chemical investigations, is a major problem in virus work.

The invention provides processes for the production of high titer virus suspensions which are of adequate strength for many purposes and enables virus suspensions of smaller bulk to be handled than would otherwise be necessary.

The invention provides a process by which high titer virus suspensions are produced from highly concentrated tissue cell cultures. Relatively small volumes of cultures are therefore involved which is advantageous in a process handling infected material.

The invention also provides a process by which high titer virus suspensions are produced in cultures of relatively large capacity.

The invention further provides high titer virus suspensions which are free from added cell nutrients.

Highly concentrated tissue cell cultures have not been produced and used hitherto with any facility or on any significant scale to replicate a virus as it has been considered that a corresponding high concentration of essential nutrient medium would be required to keep a high concentration of tissue cells viable and enable the cells to replicate a virus in good yield. One essential nutrient is glucose (or other suitable carbohydrate) in a high concentration corresponding to that of the cells, and owing to the production of acid as the glucose is metabolized, a correspondingly high concentration of buffer is required to preserve the pH value of the culture medium at a desirable value in high cell concentrations and prevent it falling below that pH value, usually about 6.8, below which virus replication is severely restricted. There is a limit to the amount of buffer which can be added to isotonic or nearly isotonic tissue culture media and hence there is a limit to the concentration of cells which can be supported in an essential nutrient medium including glucose.

We have now discovered that viable tissue cells, which are capable of replicating a virus, do not require when in a sufficiently high concentration (at least about $5\times10^6$ cells/ml.) a nutrient medium containing either glucose (or other suitable carbohydrate) or any nitrogenous nutrients and can replicate the virus in a nutrient-free medium such as a physiologically balanced salt solution such as Earle's saline without glucose. Thus no glucose or not more than normal tissue culture concentrations of glucose need be used so that the glucose content and hence the production of acid can be restricted to a level which does not decrease the pH value of the medium too much in the presence of acceptable amounts of buffer. Throughout the specification glucose is used to mean glucose or an equivalent carbohydrate or carbohydrates.

We have discovered that, provided there is an adequate supply of oxygen, concentrations of tissue cells of the order of $10^7$/ml. can readily replicate a virus when in a nutrient-free solution. Even cell concentrations up to and around $10^8$/ml. can replicate a virus with adequate oxygenation when in a medium which is nutrient-free or which contains a nutrient restricted to around normal tissue culture levels. As a result high titer virus suspensions, having the order of $10^9$ and even $10^{10}$ virus units/ml. may be obtained.

2

We have determined that, by providing adequate oxygenation, relatively large volumes of culture of the order of one litre or more can successfully replicate virus. The necessary degree of oxygenation in deep cultures of relatively high titer can conveniently be produced by providing a high proportion of oxygen in the gas phase as we have discovered that high concentrations of oxygen do not produce toxic effects.

We have established that both primary tissue culture cells and transformed tissue culture cells (examples of which have been described in a paper entitled "Transformation of Normal Cells in Tissue Culture," by J. C. N. Westwood, I. A. Macpherson and D. H. J. Titmuss; Brit. J. Exptl. Pathol., vol. 38, 1957, pages 138–154) can replicate a virus in aerobic conditions in the absence of a nutrient medium.

The viability of the cells is maintained at a high level in these restricted nutrient conditions sufficiently long for a single cycle of virus replication to be metabolically complete before the host cells deteriorate due to lack of external nutrients. A high proportion of the cells should therefore be initially infected with the virus within a few hours of the cells having been taken from normal nutrient conditions.

In particular, poliovirus suspensions have not been produced in adequate concentrations and we have discovered that primary tissue culture cells (for example, monkey kidney cells) and transformed cell lines (such as transformed rabbit kidney cell lines) can replicate poliovirus when in a nutrient-free or nutrient restricted medium. Provided there is an adequate supply of oxygen, concentrations of cells of at least about $5\times10^6$ ml. can replicate poliovirus in the absence of glucose (or in the presence of normal tissue culture levels of glucose and buffer) to produce high titer poliovirus suspensions containing the order of $10^9$ PFU/ml. or more. The virus titer PFU/ml. (plaque-forming units/ml.) is based on Cooper's modification of Dulbecco's plaque technique.

Maximum yields are obtained for cell concentrations of about $10^7$/ml. when the pH value of the medium is in the range 6.8–7.7 and there is a sodium bicarbonate buffer concentration between about 0.05 and 0.25% in the absence of glucose. Excess sodium bicarbonate in the absence of glucose reduces the virus yield. Only a slight reduction in virus yield results from the absence of a nutrient medium.

In accordance with the invention, a process for the production of high titer poliovirus preparations comprises the steps of growing tissue cells, removing the tissue cells from their growth medium, resuspending the cells in a nutrient-free medium at a concentration of at least $5\times10^6$ cells/ml., and infecting the cells with poliovirus whereby after about 24 hours in aerobic conditions a poliovirus suspension is produced containing at least $5\times10^8$ PFU/ml. The cells should be infected within a few hours of their removal from the growth medium and at least one and preferably about two poliovirus should be provided per tissue cell to ensure that a high proportion of the cells are infected at the outset.

An example of the production, in accordance with this process, of a poliovirus suspension is as follows.

The ERK1 cell line, derived from embryo rabbit kidney as described in the paper previously referred to by Westwood, Macpherson and Titmuss, is grown in monolayer cultures in a standard tissue culture nutrient medium comprising: calf serum 10%, tryptic meat broth 5%, yeast extract 0.5%, Fildes' peptic digest of sheep's blood 0.1% and Earle's saline (modified to contain 0.4% glucose and 0.3% $NaHCO_3$) to 100%.

The cells are obtained in suspension with 0.05% trypsin–0.05% ethylene-diamine-tetra-acetic acid in phosphate-buffered saline, pH 7.2, with 0.1% sodium bicarbonate and centrifuged. The harvested cells are deposited in the centrifuge and washed with ES–G solution (Earle's saline without glucose and buffered as required) and then resuspended in ES–G solution and buffered with 0.11% sodium bicarbonate and 5% $CO_2$ in air. The cells in suspension are infected with poliovirus of the type required (2 PFU/cell) and the mixture diluted to a cell concentration of $10^7$/ml. The mixture is placed in a culture vessel, gassed with air or oxygen containing the appropriate concentration (about 5%) of carbon dioxide and incubated at 37° C. with agitation. The pH value is about 7.2–7.3 before finally falling to about 7.0. After about 24 hours the culture is cooled, centrifuged free from cell debris to produce a supernatant fluid containing the virus (about $2\times10^9$ PFU/ml.) which is stored at 2–4° C.

Monkey kidney cells may be used instead of the ERK embryo rabbitt kidney cells to produce high titer poliovirus suspensions in a similar manner. The monkey kidney cells are grown in Roux bottles in the standard tissue culture nutrient medium and after two to three weeks growth an inoculum of $1\text{–}2\times10^6$ cells per bottle produces about $2\times10^7$ cells. The cells are trypsinized, treated and resuspended in ES–G solution at a concentration of $10^7$ cells/ml. as described for the ERK cells. Again with treatment, as previously described, the suspended cells infected with poliovirus (2 PFU/cell) produced after incubation at 37° C. for 16–24 hours poliovirus yields of between $10^9$ and $3.6\times10^9$ PFU/ml.

Poliovirus prepared in nutrient-free medium is contaminated only with soluble constituents of the host cells. Replacement of the original complex tissue culture medium by ES–G solution considerably reduces the protein content of the resulting virus-containing fluid. A typical preparation, having $2\times10^9$ PFU/ml., contained $10^{12}$ PFU of poliovirus per gram of protein.

Apart from the necessity for the oxygen supply to be adequate and for the virus replication stage to be carried out without undue delay after the host cells are removed from their normal nutrient conditions, the lack of glucose does not significantly affect the process. Glucose if present during virus replication, although almost completely metabolized, does not cause any significant increase in virus yield.

The effect of omitting all the nitrogenous and carbohydrate constituents from the medium is demonstrated by the yields of poliovirus, given as log PFU/ml., obtained from ERK cells, concentration $10^7$/ml., suspended in the standard tissue culture nutrient medium, Earle's saline (ES) with glucose and Earle's saline without glucose (ES–G) as shown in Table 1.

*Table 1*

| Expt. | Standard nutrient medium | Earle's saline | Earle's saline without glucose, 0.11% $NaHCO_3$ |
|---|---|---|---|
| 1 | 9.49 | 9.34 | ----- |
| 2 | 9.34 | 9.00 | 9.15 |
| 3 | ----- | 9.56 | 9.40 |
| 4 | ----- | 9.13 | 9.30 |
| 5 | 9.51 | 9.18 | 9.38 |
| 6 | 9.38 | 8.90 | 9.32 |
| 7 | ----- | 9.30 | 9.20 |
| Mean yield | 9.43 | 9.20 | 9.29 |

The standard nutrient medium an Earle's saline were both provided with 0.2% glucose and 0.22% $NaHCO_3$ for experiments 1–4 and with 0.4% glucose and 0.44% $NaHCO_3$ for experiments 5–7.

All cultures were gassed with 5% (v./v.) $CO_2$ in air.

Similar yields were obtained in all three suspending fluids. The mean yields expressed as PFU/cell were 270, 160 and 200 for tissue culture medium, Earle's saline and ES–G solution respectively. Comparison of the last two figures shows that the virus yield is independent of the utilisation of glucose from the medium. Similar experiments showed that the addition of glucose to cultures of monkey kidney cells did not increase the virus yield.

Adding glutamine at various concentrations up to 0.3% to the infected cells suspended in Earle's saline with and without glucose up to 0.8% with appropriate amounts of $NaHCO_3$ causes no detectable increase in virus yield.

Although the virus replication is dependent on nutrients present in the cell at the time of infection, special treatment of the cells during the growth period is not necessary.

For example, for cells cultured for seven days without change of medium, neither complete renewal of the cell growth medium nor the addition of individual medium components on the fifth day of culture produced any improvement in the subsequent virus yield from cells harvested on the seventh day. Apparently, the cell growth medium is not sufficiently exhausted after seven days to affect the subsequent ability of the cells to produce virus.

Since pH influences the rate of cell glycolysis it might affect the storage of cell carbohydrate or intermediates. However, it was found that varying the pH (7.2 to 8.0) or omission of glucose on the last day of cell culture did not significantly affect the subsequent virus yield from cells in ES–G solution.

There is an unavoidable delay of up to about two hours while the cells are harvested and prepared for infection. This has no detrimental effect as even increasing this delay period to about three hours by holding the cell suspension in ES–G solution at 20° C. produces no decrease in virus yield. After six hours, however, the virus yield is decreased up to three-fold from cells held at 20° C. and up to six-fold from cells held at 37° C. This decrease is partially reversed by adding glucose when the cells are subsequently infected with virus.

Table 2 shows the yields of poliovirus obtained from ERK cells, concentration $10^7$ ml., in small volumes (10 ml.) of ES–G solution when various concentrations of bicarbonate-$CO_2$ buffer are present. The yield is optimal between 0.07 and 0.22% $NaHCHO_3$ with appropriate $CO_2$ concentrations. Above this range, the yield falls progressively. The initial pH values were about 7.2 and the final values not less than 6.8.

*Table 2*

| Buffer concentration | | Virus yield log PFU/ml. | | |
|---|---|---|---|---|
| $NaHCO_3$, percent | $CO_2$ in air, percent (v./v.) | Expt. 1 | Expt. 2 | Expt. 3 |
| 0.04 | 0 | ----- | 9.2 | 8.6 |
| 0.07 | 1 | ----- | 9.4 | 8.9 |
| 0.11 | 5 | 9.0 | 9.4 | 8.9 |
| 0.22 | 10 | 9.0 | ----- | 9.0 |
| 0.33 | 15 | ----- | ----- | 8.7 |
| 0.44 | 20 | 8.5 | 9.1 | 8.4 |
| 0.66 | 30 | 7.0 | ----- | 6.9 |
| 0.88 | 40 | 6.7 | ----- | ----- |

For higher cell concentrations a somewhat higher concentration of bicarbonate-$CO_2$ buffer is desirable. Table 3 shows the yield of poliovirus obtained from ERK cells at cell concentrations of 0.5 and $1.0\times10^8$ cells/ml. in agitated 10 ml. volumes of ES–G solution with various concentrations of buffer present. The initial pH value of the cultures was about 7.3. It should be noted that the gas phase is $CO_2$ in oxygen as, to be hereinafter more fully described, the adequate oxygenation which is essential for the production of high titer virus suspensions is more readily obtained with a high concentration of oxygen in the gas phase.

Table 3

| Cell concn., cells/ml ×$10^{-8}$ | NaHCO$_3$ concn., percent | CO$_2$ in O$_2$, percent (v./v.) | Final pH of cultures | Virus titer, PFU/ml ×$10^{-9}$ | | |
|---|---|---|---|---|---|---|
| | | | | Expt. 1 | Expt. 2 | Expt. 3 |
| 0.5 | 0.11 | 0 | 6.5 | -------- | <0.005 | <0.006 |
| 0.5 | 0.22 | 5 | 6.9 | 8.5 | 5.0 | 10.0 |
| 0.5 | 0.33 | 5 | 7.0 | 7.6 | 4.5 | 8.0 |
| 0.5 | 0.44 | 10 | 7.0 | 10.0 | 4.0 | 8.0 |
| 0.5 | 0.66 | 15 | 7.1 | 0.6 | 0.03 | 0.05 |
| 1.0 | 0.22 | 5 | 6.8 | 8.4 | 12.0 | -------- |
| 1.0 | 0.33 | 5 | 6.8 | 10.0 | 11.0 | -------- |
| 1.0 | 0.44 | 10 | 6.8 | 10.0 | 7.0 | -------- |
| 1.0 | 0.66 | 15 | 7.0 | 2.0 | 1.4 | -------- |

From Table 3 it can be seen that the optimum bicarbonate concentration is between about 0.2–0.5%. The optimum buffer concentration therefore increases somewhat with an increase in cell concentration (as a little acid is produced by cell metabolism), but the buffer concentration is not proportional to the cell concentration.

Glucose can be used to offset the yield-lowering effect of a high bicarbonate concentration. As indicated by the results given in Table 1, an excess of 0.1% of bicarbonate can be compensated for by approximately 0.1% of glucose in around normal tissue culture limits and up to about 0.5% glucose.

No alternative buffer for bicarbonate-CO$_2$ has been found. For example, when tris (tris-hydroxymethyl aminomethane) was used as a buffer virus replication did not occur. It was necessary to use a relatively high concentration of tris (0.05 M) to provide adequate pH control in the cultures; but tris is apparently toxic at this concentration as the addition of bicarbonate to cultures containing 0.05 M tris did not promote virus replication.

In relatively low concentrations (less than about $10^6$/ml.), the host cells can obtain the energy required for the virus replication by the metabolism of normal tissue cell concentrations of glucose. In higher cells concentrations, when no more than restricted amounts of glucose can be present, the cells must obtain this energy at least in part from the oxidative metabolism.

The higher the cell concentration, the more insignificant becomes the amount of glucose which can be present and we have determined that the virus replication process becomes more dependent on an adequate supply of oxygen.

In accordance with a salient feature of the present invention, virus replication in cultures of relatively large capacity having cell concentrations of $10^7$/ml. or more is successfully carried out by means of adequate oxygenation.

The provision of an adequate supply of oxygen becomes more exacting the greater the concentration of tissue cells and the greater the volume of culture medium.

For small volumes (the order of 10 ml.) of glucose-free culture medium which are strongly agitated (for example, by a rotary shaker), maximum virus yields are obtained with oxygen concentrations in excess of 5% in cell suspensions of $10^6$ to $10^7$ cells/ml. Near maximum yields are still obtained with a gas phase 95% oxygen-5% CO$_2$ showing that oxygen exerts no "toxic" effect. The virus concentration is greatly diminished with oxygen concentrations below 5% and is practically suppressed at about 0.5% oxygen in suspensions having $10^7$ cells/ml. and at about 0.1% in suspensions having $10^6$ cells/ml.

If there is no oxygen present and air is replaced by nitrogen in the gas phase, virus replication is suppressed in a glucose-free culture of cell suspensions having a concentration of $10^7$ cells/ml. or even of only $10^6$ cells/ml.

However, for small culture volumes having cell concentrations up to about $10^7$ cells/ml., lack of oxygen can be compensated by the presence of glucose in up to concentrations of about 0.5%. For example, 10 ml. quantities of cell suspensions having $10^7$ cells/ml. produced similar poliovirus titers (approximately 2×$10^9$ PFU/ml.) in ES-G solution with air (with 5% CO$_2$) in the gas phase or with nitrogen (with 5% CO$_2$) in the gas phase and in Earle's saline solution having 0.4% glucose and 0.44% bicarbonate.

In larger volumes of cell suspensions in excess of 100 ml. the presence of glucose can only at best partially compensate for the absence of oxygen regardless of whether the bicarbonate buffer concentration is increased above 0.44% or the glucose concentration is reduced below 0.4% to achieve better control of the pH value.

By employing a gas phase containing a high proportion of oxygen (conveniently 95% oxygen with 5% CO$_2$) virus replication can be successfully carried out in relatively large volumes (the order of one litre or more) of cell suspensions. Adequate agitation of the suspensions is necessary to ensure that the oxygen is sufficiently available throughout the culture and this may be achieved by magnetic stirring. Too rapid stirring causes low yields, possibly due to early cell disruption, and moderate stirring is generally suitable.

Table 4 shows the results of typical experiments with various volumes of cell suspensions ($10^7$ cells/ml.) replicating type I (Brunhilde), type II (Lansing) and type III (Leon) poliovirus. All cultures were buffered with 0.11% sodium bicarbonate, gassed with 95% oxygen-5% CO$_2$ and stirred with magnets (length 5 cm.) rotated at 450–600 r.p.m. The cells were in all cases suspended in ES-G solution.

| Virus type | Cell suspension | | Container | | | Virus titer, PFU/ml.×$10^{-9}$ |
|---|---|---|---|---|---|---|
| | Volume (ml.) | Depth (cm.) | Capacity (ml.) | Height to bottle shoulder (cm.) | Diameter (cm.) | |
| I | 230 | 3.6 | 1,000 | 17.5 | 9 | 2.5 |
| I | 270 | 2.4 | 2,000 | 20 | 12 | 2.3 |
| I | 450 | 4.0 | 2,000 | 20 | 12 | 1.6 |
| I | 450 | 2.5 | 4,450 | 22 | 15 | 2.1 |
| I | 1,500 | 4.8 | 10,000 | 32 | 20 | 1.6 |
| II | 200 | 3.3 | 1,000 | 17.5 | 9 | 0.4 |
| II | 210 | 3.4 | 1,000 | 17.5 | 9 | 0.36 |
| II | 374 | 3.4 | 2,000 | 20 | 12 | 0.22 |
| II | 530 | 4.6 | 2,000 | 20 | 12 | 0.5 |
| III | 274 | 2.4 | 2,000 | 20 | 12 | 1.3 |
| III | 380 | 3.4 | 2,000 | 20 | 12 | 0.75 |
| III | 400 | 3.6 | 2,000 | 20 | 12 | 1.3 |

Good yields were obtained with poliovirus types I and III and in view of other results, the poorer yields of type II are most probably due to the strain used.

Although no glucose was used in these culture media, we have found that the presence of some glucose in the suspending medium makes it possible to obtain good yields of virus in greater depths of cell suspension within a completely sealed culture vessel and therefore obviates the necessity to increase the oxygen solution-rate by continuous gas flow.

In order to obtain very high titer virus suspensions, it is necessary to replicate the virus in cell suspensions having a concentration of about $10^8$ cells/ml. At this concentration a very high oxygen solution rate is necessary and we have determined that this can be achieved in a sealed culture vessel by using a high proportion of oxygen in the gas phase and vigorous agitation. For example, with 95% oxygen and 5% $CO_2$ in the gas phase and vigorous agitation, the replication of virus in cell suspensions having various titers from $10^7$ cells/ml. up to $10^8$ cells/ml. is fully maintained to give virus titers from $10^9$ up to $10^{10}$ PFU/ml.

If the agitation is insufficiently vigorous an increase in virus titer is obtained for cells concentrations up to about $5\times10^7$ cells/ml. but not above this concentration. If air with 5% $CO_2$ is used in the gas phase, no increase in virus titer beyond the order of $10^9$ PFU/ml. is obtained if the agitation is gentle while if the agitation is vigorous a steady increase from about $10^9$ up to about $5\times10^9$ PFU/ml. is obtained as the cell concentration is increased from $10^7$ up to $10^8$ cells/ml.

The production of a very high titer poliovirus suspension will now be given by way of example.

Tissue cells (either ERK cells or monkey kidney cells) are grown, harvested, washed, susupended in ES–G solution and infected with poliovirus (2 PFU/cell) as previously described except that the culture mixture is diluted to a cell conccentration of $10^8$ cells/ml. and the sodium bicarbonate buffer strength is adjusted to be between about 0.2 and 0.4 (preferably about 0.33%).

The mixture is then placed in a culture vessel, gassed with oxygen containing about 5% carbon dioxide and incubated at 37° C. with sufficiently strong agitation to cause an adequate solution of oxygen in the mixture. After about 24 hours the culture is cooled and centrifuged to produce a supernatant fluid containing about $10^{10}$ PFU/ml. of poliovirus.

From the results given in Table 3 it will be seen that a poliovirus suspension having a virus titer of the order of $10^{10}$ PFU/ml. may be obtained under suitable conditions from cell suspensions having a concentration of $5\times10^7$ cells/ml. or more.

We claim:

1. A process for the production of a high titer suspension of a given virus and which comprises preparing a suspension of tissue cells capable of replicating said virus and having a concentration of between $5\times10^7$ cells/ml. and $10^8$ cells/ml. in a nutrient-free physiologically balanced salt solution, infecting the cells with virus at a rate of at least one virus per cell, and incubating the suspension in the presence of a gas phase containing from 5 to 95% oxygen by volume to maintain an adequate oxygen solution rate until one cycle of virus replication has taken place.

2. A process according to claim 1 and in which the said balanced salt solution is buffered with between about 0.2 and 0.5% bicarbonate and the gas phase contains at least 5% carbon dioxide by volume.

3. A process according to claim 1 and in which the suspension is incubated in the presence of a gas phase containing 95% of oxygen and 5% of $CO_2$ by volume.

References Cited in the file of this patent

Hartley et al.: Proc. Soc. Exp. Biol. Med., August, September 1956, pages 667–669.

Cartwright et al.: J. Gen. Microbiol., June 1957, pages 730–733.

Cartwright et al.: J. Gen. Microbiology, pages 734–748, June 1957.

Bryant et al.: J. of Nat. Cancer Inst., pages 360–364, August 1958.

Rivers et al.: Viral and Ricketsial Infections of Man, pp. 15–16, 209–229, published December 19, 1958, by J. B. Lippincott Co., Philadelphia, Pa.

Cappel Cards Nos. SS–1, SS–2, SS–3, M–1, M–2, M–3, M–5, pub. by Balt. Biol. Labs. Inc., West Chester, Pa., June 1960, 10 pages.